(12) United States Patent
Koskela et al.

(10) Patent No.: US 11,963,151 B2
(45) Date of Patent: Apr. 16, 2024

(54) BEAM FAILURE RECOVERY FOR SERVING CELL

(71) Applicant: Nokia Technologies Oy, Espoo (FI)

(72) Inventors: Timo Koskela, Oulu (FI); Samuli Turtinen, Ii (FI); Chunli Wu, Beijing (CN); Benoist Sebire, Tokyo (JP); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 394 days.

(21) Appl. No.: 17/274,836

(22) PCT Filed: Sep. 27, 2018

(86) PCT No.: PCT/CN2018/108130
§ 371 (c)(1),
(2) Date: Mar. 10, 2021

(87) PCT Pub. No.: WO2020/061955
PCT Pub. Date: Apr. 2, 2020

(65) Prior Publication Data
US 2022/0061087 A1  Feb. 24, 2022

(51) Int. Cl.
*H04W 72/044* (2023.01)
*H04W 16/28* (2009.01)
(Continued)

(52) U.S. Cl.
CPC ......... *H04W 72/046* (2013.01); *H04W 16/28* (2013.01); *H04W 24/10* (2013.01);
(Continued)

(58) Field of Classification Search
CPC ... H04W 72/046; H04W 16/28; H04W 24/10; H04W 72/02; H04W 72/1268;
(Continued)

(56) References Cited

U.S. PATENT DOCUMENTS 10,784,944 B2 *  9/2020  Cirik .................... H04W 72/046
11,464,064 B2 * 10/2022  Zhou .................... H04W 24/08
(Continued)

FOREIGN PATENT DOCUMENTS

CN    107211401 A    9/2017
CN    108513737 A    9/2018
(Continued)

OTHER PUBLICATIONS

Nokia, Nokia Shanghai Bell, "SCell Beam Failure Recovery" 3GPP TSG RAN WG2 #102 R2-1808024, http://www.3gpp.org/ftp/tsg_ran/WG2_RL2/TSGR2_102/Docs/R2-1808024.zip, May 10, 2018.
(Continued)

*Primary Examiner* — Brian T O Connor
(74) *Attorney, Agent, or Firm* — Harrington & Smith (57) ABSTRACT

Embodiments of the present disclosure relate to methods, devices and computer readable mediums for beam failure recovery. The method includes detecting a beam failure on a serving cell of the terminal device, the serving cell including at least one of a primary cell and a secondary cell serving the terminal device. The method further includes in response to detecting the beam failure on the serving cell, generating a medium access control, MAC, control element, CE, the MAC CE including a field associated with the serving cell, wherein the field is set to be a predefined value indicating the beam failure. The method further includes transmitting the MAC CE to a network device associated with the serving cell.

34 Claims, 4 Drawing Sheets

(51) Int. Cl.
*H04W 24/10* (2009.01)
*H04W 72/02* (2009.01)
*H04W 72/1268* (2023.01)
*H04W 72/21* (2023.01)
*H04W 72/23* (2023.01)
*H04W 74/04* (2009.01)

(52) U.S. Cl.
CPC ....... *H04W 72/02* (2013.01); *H04W 72/1268* (2013.01); *H04W 72/21* (2023.01); *H04W 72/23* (2023.01); *H04W 74/04* (2013.01)

(58) Field of Classification Search
CPC ..... H04W 72/21; H04W 72/23; H04W 74/04; H04W 72/20; H04W 80/02; H04B 7/0695; H04B 7/0408; H04B 7/0617
See application file for complete search history.

(56) References Cited

U.S. PATENT DOCUMENTS

| | | | | |
|---|---|---|---|---|
| 11,683,216 | B2* | 6/2023 | Babaei | H04L 41/0654 370/216 |
| 11,729,795 | B2* | 8/2023 | Liu | H04W 72/23 370/329 |
| 11,812,488 | B2* | 11/2023 | Deenoo | H04W 74/0833 |
| 11,871,451 | B2* | 1/2024 | Awadin | H04W 74/0866 |
| 2016/0057800 | A1 | 2/2016 | Ingale et al. | 76/27 |
| 2017/0006587 | A1 | 1/2017 | Kim et al. | 75/42 |
| 2018/0042000 | A1 | 2/2018 | Zhang et al. | 72/46 |
| 2018/0191422 | A1 | 7/2018 | Xia et al. | |
| 2018/0192371 | A1 | 7/2018 | Jung et al. | |
| 2019/0313264 | A1* | 10/2019 | Lin | H04W 24/08 |
| 2020/0244414 | A1 | 7/2020 | Takahashi et al. | |
| 2020/0389220 | A1 | 12/2020 | Kang et al. | |
| 2021/0068162 | A1* | 3/2021 | Agiwal | H04L 41/0668 |
| 2021/0083821 | A1* | 3/2021 | Park | H04W 76/34 |

FOREIGN PATENT DOCUMENTS

| | | | |
|---|---|---|---|
| JP | 2017154085 | A | 9/2017 |
| KR | 20150020167 | A | 2/2015 |
| KR | 20160048177 | A | 5/2016 |
| WO | WO 2017/024516 | A1 | 2/2017 |
| WO | WO 2018/031327 | A1 | 2/2018 |
| WO | WO-2018164332 | A1 | 9/2018 |

OTHER PUBLICATIONS

Huawei et al. "Remaining Issue for Beam Failure Recovery" 3GPP Draft; R2-1800632, $3^{rd}$ Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018 Jan. 12, 2018, XP051386264, Retrieved from the Internet: URL: http://www.3gpp.org/ftp/tsg%5Fran/WG2%5FRL2/TSGR2%5FAHs/2018%5F01%FNR/Docs/ [retrieved on Jan. 12, 2018].

Huawei et al. "RAN2 Aspects of DL Beam Management" 3GPP Draft; R2-1710562, $3^{rd}$ Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017, XP051342600, Retrieved from the Internet: URL: http://www.3gpp.org/ftp/Meetings_3GPP_SYNC/RAN2/Docs/ [retrieved on Oct. 8, 2017].

"MAC Impacts: Beam Failure Recovery for SCell", Samsung, 3GPP TSG-RAN2 101bis, R2-1804303, Apr. 2018, 8 pages.

"BFR on SCell", InterDigital Inc., 3GPP TSG-RAN WG2, RAN2#102, R2-1806321, May 2018, 2 pages.

* cited by examiner

BEAM FAILURE RECOVERY FOR SERVING CELL

CROSS REFERENCE TO RELATED APPLICATION

This patent application is a U.S. National Stage application of International Patent Application Number PCT/CN2018/108130 filed Sep. 27, 2018, which is hereby incorporated by reference in its entirety.

TECHNICAL FIELD

Embodiments of the present disclosure generally relate to the field of telecommunication, and in particular, to methods, devices and computer readable storage media for beam failure recovery (BFR) for a serving cell.

BACKGROUND

New radio access system, which is also called NR system or NR network, is the next generation communication system. It has been agreed that carrier aggregation (CA) which is used in Long Term Evolution (LTE)-Advanced to increase the bandwidth will be supported in the NR system. When CA is used, there are a number of serving cells. Generally, a primary cell (PCell) and at least one secondary cell (SCell) are provided. A beam failure may occur when the quality of beam pair(s) of a serving cell falls low enough (for example, comparison with a threshold or time-out of an associated timer).

A beam failure recovery procedure is a mechanism for recovering beams when all or part of beams serving user equipment (UE) has failed. Beam recovery may be also referred to as link reconfiguration. Aim of the beam recovery is to detect when one or multiple physical downlink control channels (PDCCH) links are considered to be in failure conditions and recover the link. To recover the link, UE initiates signaling toward network to indicate failure and new potential link (beam) called candidate link (beam). As a response to beam failure recovery request (BFRR) received from the UE, the network may configure UE with a new PDCCH link. Currently the beam failure recovery has been defined for one serving cell, which in practice covers beam failure recovery for PCell only. Thus, there still remain questions regarding the beam failure recovery for SCell.

SUMMARY

In general, example embodiments of the present disclosure provide methods, devices and computer readable storage media for beam failure recovery for a serving cell.

In a first aspect, there is provided method implemented at a terminal device. The method comprises detecting a beam failure on a serving cell of the terminal device, the serving cell comprising at least one of a primary cell and a secondary cell serving the terminal device. The method further comprises in response to detecting the beam failure on the serving cell, generating a medium access control, MAC, control element, CE, the MAC CE comprising a field associated with the serving cell, wherein the field is set to be a predefined value indicating the beam failure. The method further comprises transmitting the MAC CE to a network device associated with the serving cell.

In a second aspect, there is provided method implemented at a network device. The method comprises. The method further comprises receiving, from a terminal device, a medium access control, MAC, control element, CE, the MAC CE comprising a field associated with a serving cell of the terminal device, the serving cell comprising at least one of a primary cell and a secondary cell serving the terminal device, wherein the field is set to be a predefined value indicating a beam failure. The method further comprises determining, based on the field in the MAC CE, the beam failure on the serving cell.

In an third aspect, there is provided a terminal device. The device comprises at least one processor; and at least one memory including computer program codes. The at least one memory and the computer program codes are configured to, with the at least one processor, cause the device at least to perform the method according to the first aspect.

In a fourth aspect, there is provided a network device. The device comprises at least one processor; and at least one memory including computer program codes. The at least one memory and the computer program codes are configured to, with the at least one processor, cause the device at least to perform the method according to the second aspect.

In an fifth aspect, there is provided an apparatus comprising means for performing the steps of the method according to the first aspect.

In a sixth aspect, there is provided an apparatus comprising means for performing the steps of the method according to the second aspect.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

It is to be understood that the summary section is not intended to identify key or essential features of embodiments of the present disclosure, nor is it intended to be used to limit the scope of the present disclosure. Also, it should be noted that the method is not limited to any specific radio layer performing the signaling. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of; configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
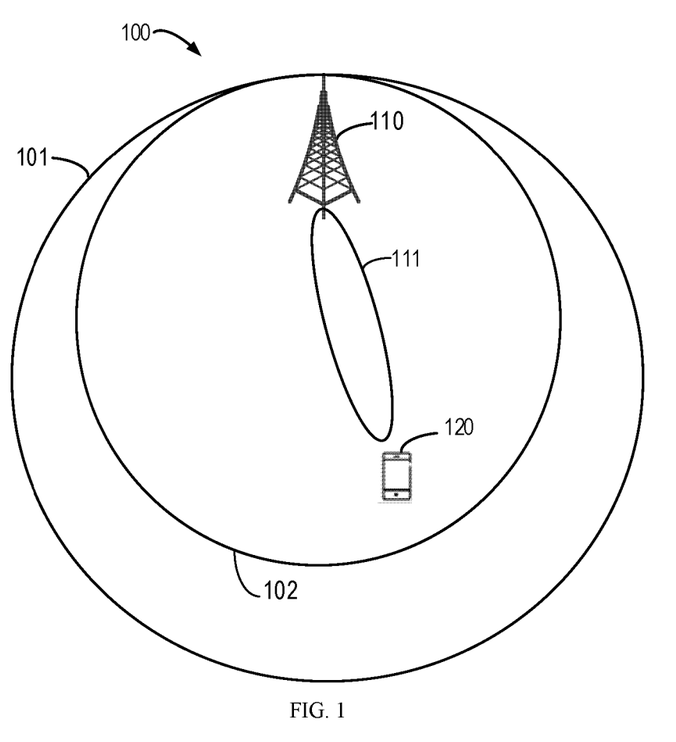
FIG. 1 shows an example communication network in which embodiments of the present disclosure can be implemented.

FIG. 1 shows an example communication network 100 in which embodiments of the present disclosure can be implemented. The network 100 includes a network device 110 and a terminal device 120 served by the network device 110. The network 100 may provide one or more serving cells 101, 102 to serve the terminal device 120. It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure. It is to be noted that the term "cell" and "serving cell" can be used interchangeably herein.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

CA can be supported in the network 100, in which two or more component carriers (CCs) are aggregated in order to support a broader bandwidth. In CA, the network device 110 may provide to the terminal device 120 a plurality of serving cells including one PCell 101 and at least one SCell 102. Although only one SCell 102 is shown in FIG. 1, the network device 110 may provide a plurality of SCells. It is also to be understood that the configuration of PCell 101 and SCell 102 shown in FIG. 1 is only for the purpose of illustration without suggesting any limitations. PCell 101 and SCell 102 may be in other configuration than that shown in FIG. 1.

In embodiments, the network device 110 is configured to implement beamforming technique and transmit signals to the terminal device 120 via a plurality of beams. The terminal device 120 is configured to receive the signals transmitted by the network device 110 via the plurality of beams. There may be different beams configured for the PCell 101 and the SCell 102. As shown in FIG. 1, a DL beam 111 is configured for the SCell 102. It is to be understood that the SCell 102 may have more beams associated therewith. Although not shown, the PCell 101 may also have beams associated therewith.

As mentioned above, a beam failure may occur on any of the PCell 101 and the SCell 102. Now a brief introduction to the beam failure detection (BFD) and beam failure recovery (BFR) will be described.

A network device configures a terminal device with a set of reference signals (RSs) for monitoring the quality of the link. This set of RSs may be referred as Q0 or beam failure detection RS or BFD-RS. Typically, BFD-RS(s) are configured to be spatially QCL'd (short for 'QCL-TypeD', see below) with PDCCH demodulation reference signal (DMRS). That is, these RSs correspond to downlink beams used to transmit PDCCH. Downlink beams are identified by RS, either synchronization signal (SS)/physical broadcast channel (PBCH) block index (time location index) or channel state information-reference signal (CSI-RS) resource (set) index. The network device may configure the BFD-RS list using Radio Resource Control (RRC) signaling or it may be possible to use combined RRC and medium access control (MAC) control element (CE) signaling.

When two different signals share the same QCL type, they share the same indicated properties. As an example, the QCL properties may be e.g. delay spread, average delay, Doppler spread, Doppler shift, spatial RX. QCL type A means Doppler spread, Doppler shift, delay spread, and/or average delay, and QCL type D means spatial RX. Currently, QCL types are defined as following:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

As a further example, if a CSI-RS and a SSB have the type D QCL assumption between each other, it means that a network device (UE) may utilize the same RX spatial filter (beam) to receive these signals.

When the terminal device is not explicitly configured with BFD-RS list, it determines the BFD-RS resources implicitly based on the configured/indicated/activated PDCCH-Transmission Configuration Indication (TCI) states per control resource set (CORESET) i.e. the downlink reference signals (CSI-RS, SS/PBCH block or SSB) that are spatially QCL'd with PDCCH DMRS, or in other words, PDCCH beams. SS/PBCH block may be included in the BFD-RS set (Q0) either directly or indirectly. That is, SSB may be configured as TRS (tracking reference signal) and the TRS may be configured as BFD-RS by activation of TCI state for PDCCH for a CORESET. SSB may also be implicitly or explicitly configured as BFD-RS.

Physical layer assesses the quality of the radio link (based on BFD-RS in set of Q0) periodically. Assessment is done per BFD-RS and when the radio link condition of each BFD-RS in the beam failure detection set is considered to be in failure condition i.e. the hypothetical PDCCH Block Error Rate (BLER) estimated using the RS is above the configured threshold, a beam failure instance (BFI) indication is provided to higher layer (MAC). One example of BLER threshold value may be the out of sync threshold used for radio link monitoring OOS/Qout=10%. Evaluation and indication is done periodically. In the case where the at least one BFD-RS is not in failure condition, no indication is provided to higher layer.

MAC layer implements a counter to count the BFI indications from the physical layer and if the BFI counter reaches a maximum value (configured by the network device), a beam failure is declared. This counter can be configured to be supervised by a timer: each time MAC receives a BFI indication from lower layer a timer is started. Once the timer expires, the BFI counter is reset (counter value is set to zero).

The network device may provide the terminal device with a list of candidate RSs for recovery that can be indicated using dedicated signal. Candidate beam L1-Reference Signal Receiving Power (RSRP) measurements may be provided to MAC layer which performs the selection of new candidate beam and determines the uplink resources to indicate the new candidate beam to the network device. The network device may configure the terminal device with dedicated signaling resources, such as contention free random access (CFRA) resources that are candidate beam specific i.e. the terminal device can indicate new candidate by sending a preamble.

Beam failure recovery procedure is initiated if the terminal device has declared a beam failure and the terminal device has detected a new candidate beam or beams based on L1 measurements (e.g. L1-RSRP). A dedicated signal can be configured (e.g. from the PRACH pool) for beam failure recovery purposes that can be used to indicate a candidate beam or in other words a beam identified by the downlink RS (reference signal, SSB or CSI-RS). This dedicated signal, can be referred to as BFR resource or CFRA resource, and it has to be noted that beam recovery procedure using CFRA signals differs slightly from Random Access (RA) procedure when it comes to gNB response to preamble reception. A dedicated preamble may be configured for each candidate RS in the Candidate-Beam-RS-List. A specific threshold may be configured so that if any of the new candidate beams (based on L1-RSRP measurements) are above the threshold, they can be indicated using the dedicated signal (set of resources in set Q1 or candidate beam list). The terminal device first selects a candidate beam from that set and in the case where there are no beams above the configured threshold, the terminal device utilizes contention based signaling to indicate new candidate beam. Contention based random access (CBRA) preamble resources are mapped to specific downlink RS (SSB or CSI-RS).

The terminal device monitors the network response to BFRR (or BFRQ) during the beam recovery response window (similar to RAR window) using the same beam alignment (i.e. same beam direction that was used for TX is used for RX) used for transmitting the recovery signal; it expects the network device to provide response using a beam that is spatially QCL'd with the indicated downlink reference signal. A case where this correspondence does not hold is not yet defined.

In case of contention free signaling used for beam recovery purposes, the terminal device expects the network device to respond to the UE using Cell-Radio Network Temporary Identifier (C-RNTI) instead of Radom Access (RA-RNTI) when CFRA procedure is used. In case CBRA resources are used, the terminal device expects response as normally in RA procedure.

Currently the beam failure recovery (BFR) or link reconfiguration procedure does not differentiate between PCell and SCell (carrier aggregation case) and can be applied to a serving cell. This applies to a case where the SCell has also a corresponding uplink carrier. If the terminal device has a corresponding UL carrier with Contention Based RACH configuration, the current BFR/link reconfiguration procedures may be applied directly.

Figure 2A:
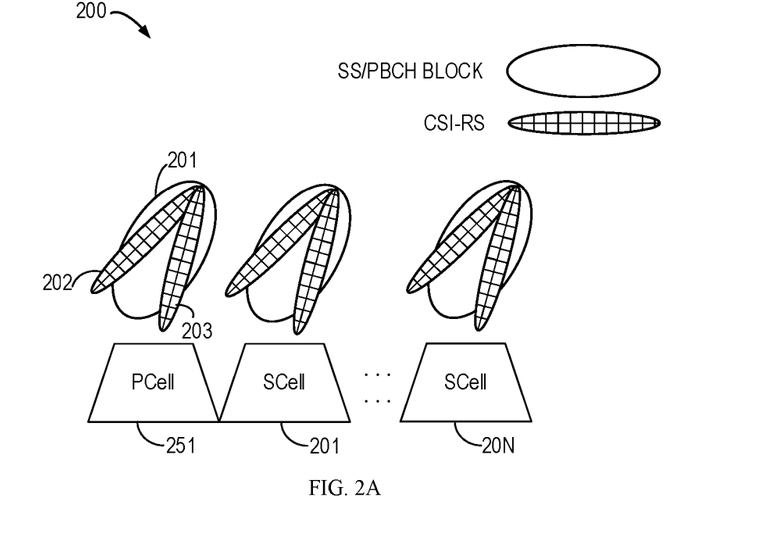
FIG. 2A is a schematic diagram illustrating a BFD-RS configuration where spatial quasi-co-location (QCL) is assumed across the carriers.
Figure 2B:
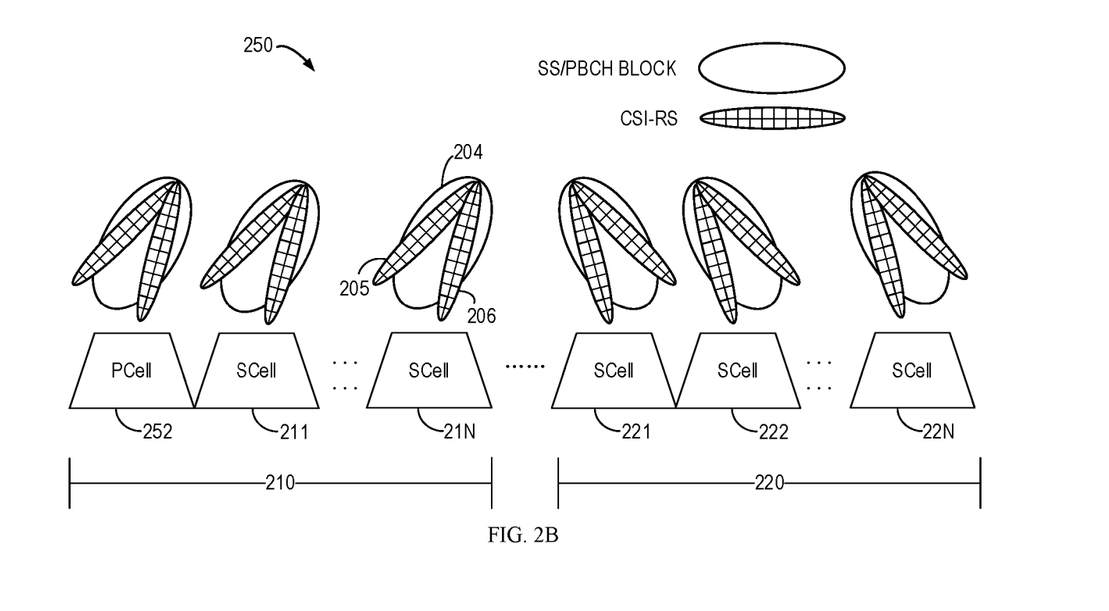
FIG. 2B is a schematic diagram illustrating a BFD-RS configuration where there is no spatial QCL assumption across the carriers

FIG. 2A is a schematic diagram 200 illustrating a BFD-RS configuration where spatial QCL is assumed across the carries and FIG. 2B is a schematic diagram 250 illustrating a BFD-RS configuration where there is no spatial QCL assumption across the carries. The RSs shown in FIGS. 2A and 2B are SS/PBCH block and CSI-RS. For example, for the PCell 251, a beam 201 is configured for the SS/PBCH block and beams 202 and 203 are configured for the CSI-RS. For SCell 21N shown in FIG. 2B, a beam 204 is configured for the SS/PBCH block and beams 205 and 206 are configured for the CSI-RS. In general, FIG. 2A illustrates a case where a group of cells may be considered to be in failure condition simultaneously i.e. if one cell is in beam failure condition it may be considered that all the cells in the group are in failure condition. Thus, in some cases it may be possible to define only one cell for beam failure detection purposes.

In the case as shown in FIG. 2A, the cross carrier spatial QCL is valid for PCell 251 and SCells 201-20N. A beam failure can be detected on BFD-RS resources (CSI-RS, SS/PBCH block) of PCell 251 and it implicitly means that all the SCells 201-20N are in the beam failure condition due to spatial QCL assumption of the reference signals used for assessing the link quality.

On the other hand, in the case as shown in FIG. 2B, the spatial QCL assumption for BFD-RS does not hold across all carriers. The PCell 252 and SCells 211-21N belong to a group of cells or in a beam management group 210, and the Scells 221, 222-22N belong to a group of SCells or another beam management group 220. There is no spatial QCL assumption between cells in the beam management groups 210 and 220. In the case where none of the SCells are spatially QCL with each other, the terminal device needs to be able to detect beam failure and perform recovery for each serving cell separately. In general, FIG. 2B illustrates that when one group of cells can be considered to be in beam failure condition, another group of cells may or may not be considered to be in failure condition.

The scenario shown in FIG. 2B may occur e.g. when the Pcell 252 is located in Frequency Range 1 (FR1 i.e. below 6 GHz "low frequency") and the SCells is configured on FR2 (e.g. above 6 GHz or "high frequency"). Alternatively, both the PCell and Scells may operate on same FR, but due to the PDCCH TCI configuration (which is cell specific) the BFD-RS detection resources may be different i.e. there may not be correspondence between the Pcell and SCell failure. The latter may happen in particular in case a cell with multiple Transmission/Reception Points (TRPs) is deployed. In yet alternative case, there may not be correspondence between the failure of one group of SCells (or more generally group of serving cells) and another group of SCells (or serving cells). A group of serving cells may comprise zero, one or more SCells and PCell may be included in the group of serving cells. It is to be noted that although the term "a group of SCell" is used in the description below, a group of SCell herein may also include a PCell.

However, the current beam failure recovery considers only one cell. For the case of SCell failure recovery, additional mechanisms are needed to make the recovery procedure and related signaling efficient. When BFD is performed on multiple SCells, some cells may fail concurrently, e.g., in the case where a same obstacle is preventing the communication to the current serving beams. Thus, a mechanism for reporting the beam failure of multiple SCells concurrently is also needed.

According to embodiments of the present disclosure, there is proposed a solution for beam failure recovery for a serving cell, and in particularly for beam failure recovery for an SCell (SCell BFR). In the present disclosure, a MAC CE format for indicating SCell BFR (which is also referred to as SCell BFR MAC CE) is proposed. To indicate the beam failure on an SCell, the SCell BFR MAC CE comprises at least one field. If a beam failure is detected on an SCell, the field associated with the SCell is set to be a predefined value to indicate the beam failure. The solution for beam failure recovery in accordance with embodiments of the present disclosure can be adapted to the beam failure occurring in the SCell. Moreover, embodiments of the present disclosure enable more efficient beam failure recovery than the conventional beam recovery schemes.

Figure 3:
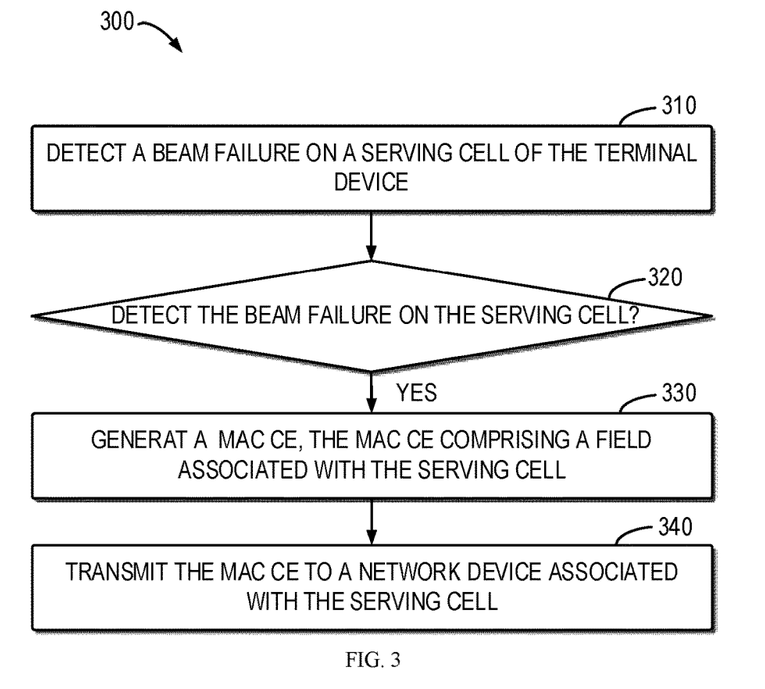
FIG. 3 shows a flowchart of an example method for BFR according to some embodiments of the present disclosure.

Principle and implementations of the present disclosure will be described in detail below with reference to FIG. 3. FIG. 3 shows a flowchart of an example method 300 for BFR according to some example embodiments of the present disclosure. The method 300 can be implemented at the terminal device 120 as shown in FIG. 1. For the purpose of discussion, the method 300 will be described with reference to FIG. 1.

At 310, the terminal device 120 detects a beam failure on a serving cell of the terminal device 120. The serving cell comprises at least one of the PCell 101 and the SCell 102. For example, the terminal device 120 may detect a beam failure on the SCell 102. At 320, the terminal device determines whether the beam failure is detected on the serving cell (e.g. the SCell 102). If the beam failure is detected on the serving cell, the process proceeds to block 330. At 330, the terminal device 120 generates an MAC CE, which is also called an SCell BFR MAC CE herein. The SCell BFR MAC CE comprises a field associated with the serving cell and the field associated with the serving cell is set to be a predefined value indicating the beam failure. It is to be noted that although the MAC CE described herein is called "SCell BFR MAC CE", the SCell BFR MAC CE can be used to indicate the beam failure on the PCell 101, or on the SCell 102, or on both of the PCell 101 and SCell 102.

Figure 4:
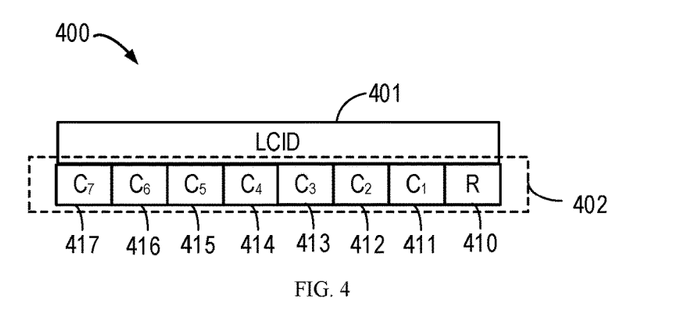
FIG. 4 shows a medium access control (MAC) control element (CE) for indicating a beam failure of a serving cell according to some embodiments of the present disclosure.

In some embodiments, the serving cell may be the SCell 102 and the SCell BFR MAC CE may comprise a bitmap including a plurality of fields and the field associated with the SCell 102 may be included in the bitmap. The format of the SCell BFR MAC CE is now described in detail with reference to FIGS. 4 and 5. FIG. 4 shows the SCell BFR MAC CE 400 in accordance with some embodiments of the present disclosure.

As shown in FIG. 4, the SCell BFR MAC CE 400 comprise a bitmap 402 and each of the Ci (i=1-7) fields 411-417 corresponds to an SCell or a group of SCells. For example, the group of SCells may be a beam management group (e.g. the beam management group shown in FIG. 2B) comprising SCells that share a common beam failure criterion. In other words, when one of the SCells in the group of SCells is in beam failure condition, the other SCells in the same group are also in beam failure condition. Although FIG. 4 shows seven Ci fields, the bitmap length in FIG. 4 should be considered as a non-limiting example and various values of 'i' can be used.

In the case where the each of the Ci fields 411-417 corresponds to an SCell, Ci may refer to an SCell index. When the corresponding field (bit in this example) is set to be the predefined value (e.g. "1"), it indicates that a beam failure has occurred on the corresponding SCell; when the corresponding field (bit in this example) is set to be another predefined value (e.g. "0"), it indicates that a beam failure has not detected on the corresponding SCell. As an example, the field corresponding to the SCell 102 is the $C_2$ field 412. Then, the terminal device 120 at 330 may set the value of the $C_2$ field 411 to be "1" to indicate the beam failure on the SCell 102.

In the case where the each of the Ci fields 411-417 corresponds to a group of SCells, the indexing of the bitmap 402 is logical. In this case, the Ci fields 411-417 are not directly mapped to the indices of the SCells but to the groups. In other words, the bitmap 402 indicates the SCells in logical order for where the failure has been detected. When the corresponding field (bit in this example) is set to be the predefined value (e.g. "1"), it indicates that beam failures has occurred on the SCells in the group; when the corresponding field is set to be another predefined value (e.g. "0"), it indicates that a beam failure has not detected on the SCells in the group.

As an example, the network device 110 may configure the terminal device 120 with SCell #1, 2, 3, 4 but the BFD is only performed for SCell #1 and SCell #3 in a manner that detecting a beam failure on SCell #1 determines also a beam failure on SCell #2, which means that SCell #1 and SCell #3 belong to a same group of SCells, e.g., SCell group 1. Accordingly, detecting a beam failure on SCell #2 determines also a beam failure on SCell #4, which means that SCell #2 and SCell #4 belong to a same group of SCells, e.g., SCell group 2. Thus, the bitmap 420 in the MAC CE 400 can be used to indicate beam failure(s) for group(s) of SCells that can be determined to be in failure based on failure of one of the SCells in the group. With two groups as in this example, only two bits would be used in the MAC CE 400.

As another example, the SCell 102 may belong to a group of SCells, to which the the $C_2$ field corresponds and the SCell 102 may be configured to determine beam failures on SCells in that group. Then, at 330, the terminal device 120 may set the value of the $C_2$ field 411 to be "1" to indicate the beam failures on that group of SCells. Additionally, if the terminal device 120 determines that a beam failure occurs on another SCell, the field associated with that SCell may also be set to the predefined value.

The MAC CE 400 may further comprise a Logical Channel ID, LCID, field 410 to identify that the MAC CE 400 is used for indicating the beam failure. In the embodiments where the bitmap 402 is associate with groups of SCells, the MAC CE 400 may include another LCID field (not shown) to indicate that bits in the bitmap 420 correspond to groups of SCells.

It is to be understood that although seven Ci fields are shown in FIG. 4, the SCell BFR MAC CE may include more or less fields to indicate the beam failure. When less than 7 SCells or groups of SCells are involved, some of the Ci field 411-417 may be reserved and when more than 7 SCells or groups of SCells are involved, the SCell BFR MAC CE may be extended to include additional bits.

Figure 5:
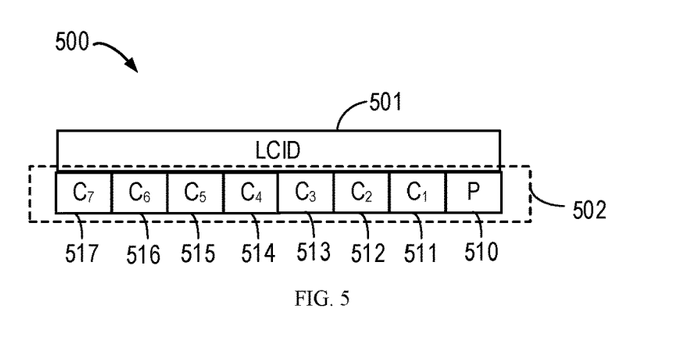
FIG. 5 shows another MAC CE for indicating a beam failure of a serving cell according to some embodiments of the present disclosure.

In some embodiments, the bitmap may include a further field associated with the PCell serving the terminal device, for example, the PCell 101 serving the terminal device 120 shown in FIG. 1. In the example MAC CE shown in FIG. 4, the R field 410 is reserved. FIG. 5 shows another SCell BFR MAC CE 500 in accordance with some embodiments of the present disclosure.

The MAC CE 500 comprises LCID field 501 and a bitmap 502 including Ci fields 511-517 and a P field 510. The LCID field 501 and Ci fields 511-517 are similar as the LCID field 401 and Ci fields 411-417 as described with reference to FIG. 5. The P field 510 is included to indicate whether a beam failure has been detected on the PCell 101.

When the P field 510 (in this example, a bit) is set to be e.g. '0', it indicates the network device 110 that the PCell 101 is not in failure. This allows the use of CBRA procedure beams that are not currently configured as active TCI states for PDCCH and prevents the network device 110 to falsely determine the beam failure of the PCell 101. When the P field 510 is set to e.g. '1', it indicates the network device 110 that the PCell 101 is also in beam failure condition and the selected DL RS (SSB/CSI-RS) indicates a new candidate beam for the PCell 101 and the bitmap 502 indicates the failed SCell indexes/group indexes.

In some embodiments, the MAC CE described herein with P field 510 may also be used to indicate only beam failure on the PCell 101 (also referred to as PCell failure). This MAC CE may be transmitted in msg-3 in a RACH procedure (e.g. contention based RACH procedure) to indicate the network device 110 that beam failure on the PCell 101 has occurred and RACH procedure has been initiated for beam failure recovery. The network device 110 may determine the new candidate beam. The MAC CE may be transmitted to indicate PCell failure regardless of the configuration for carrier aggregation i.e. the terminal device 120 may not have any SCells configured but the same MAC CE described herein could be used. Also in carrier aggregation cases (when the terminal device 120 has been configured with SCell or SCells), a beam failure occurring only on the PCell (PCell-only failure) can be indicated using the MAC CE. In some cases, the network device 110 may not configure the terminal device 120 to perform failure detection on the SCell 102 and the terminal device 120 may consider only PCell failure. The MAC CE described herein may be used to indicate PCell-only failure. In some additional embodiments, when carrier aggregation is not configured, the terminal device 120 may transmit the MAC CE with LCID only to indicate PCell failure. This mechanism can reduce the size of the MAC CE.

When a MAC CE in such a format, such as the MAC CE 500, is used, the method 300 may include additional steps or processes. The terminal device 120 may detect a beam failure on the PCell 101. If the beam failure on the PCell 101 is detected, the terminal device 120 may set P field 510 to be the predefined value (e.g. "1") to indicate the beam failure on the PCell 101.

In such embodiments, indicating whether the PCell is in failure can prevent the network device 110 to detect PCell failure when the terminal device 120 utilizes RACH procedure and also enable the terminal device 120 to indicate PCell failure using scheduling request (SR) procedure if SR is triggered and UL grant is received. This may be possible since the failure condition is 10% hypothetical PDCCH BLER for DL RS, or in the case where the uplink direction still works while the DL direction is in failure condition, the terminal device 120 is able to trigger SR on working uplink. Besides, even with RA procedure, indicating beam failure for PCell is useful information for the network device 110 to know the RA being triggered by BFR other than other cases, e.g. SR failure.

In some embodiments, when the PCell 101 is in failure condition and at least one SCell can be used to transmit on uplink, the terminal device 120 may utilize the MAC CE 500 to transmit the indication of the beam failure on the PCell 101.

In some embodiments, the SCell BFR MAC CE, for example the MAC CE 400 or 500, may have only the LCID field (401 or 501) to indicate the beam failure. Such a format may be triggered when there is only one SCell serving the terminal device 120. Alternatively, this format may be used when one SCell is used for determining the beam failure for a set/group of SCells. Alternatively, when this format is used and at least one of the SCells is in failure condition, the terminal device 120 may trigger transmission of the SCell BFR MAC CE to indicate the beam failure.

Still refer to FIG. 3. In some cases, the SCell BFR MAC CE may be triggered by some predefined conditions. In some embodiments, the SCell BFR MAC CE may be triggered in a condition when CFRA is not configured for recovery of the serving cell (e.g. SCell 102) or CFRA signaling cannot be used, for example when no SCell or SCells with candidate beam or beams with CFRA resource are available or the resources are not suitable from signal quality point of view i.e. the quality metric is below candidate beam threshold. In such embodiments, at 330, the terminal device 120 may further determine CFRA resource configured for the beam failure on the SCell 102. If there is no CFRA resource configured for the recovery of the SCell 102 or if the configured CFRA resource is not available, the terminal device 120 may generate the SCell BFR MAC CE, for example, the MAC CE 400 or 500. It is to be noted that the above acts may also be performed by the terminal device 120 at other stage of the method 300.

In some embodiments, the SCell BFR MAC CE may be triggered, when at least two SCells or two groups of SCells are in failure condition and more than one RA procedures would be triggered. In this case, the SCell MAC CE may be generated and transmitted regardless of the CFRA availability. Optionally the terminal device 120 may continue with one of the already triggered RA procedures to transmit the MAC CE.

In such embodiments, at 330, the terminal device 120 may further determine a further beam failure on a further SCell serving the terminal device 120. The further beam failure may be detected before the detection at 310 and may have triggered a RA procedure. In this case, the terminal device 120 will generate the SCell BFR MAC CE regardless of the CFRA availability. The generated SCell BFR MAC CE may comprise a further field associated with the further SCell and the further field is set to be the predefined value, e.g., "1". For example, the further field may be the $C_3$ field 413 shown in FIG. 4.

In the case where the SCells are organized into groups of SCell, the further secondary cell and the SCell 102 may belong to different groups of SCells. In other words, when at least two groups of SCells are in failure condition, the terminal device 120 may generate the SCell BFR MAC CE. As another example, PCell failure may also be indicated as part of the SCell group without explicit indication of using 'P' field in the MAC CE. That is, if a first group of SCell or SCells includes also the PCell, to indicate PCell failure in addition to SCell group failure, it is necessary to indicate only the group identifier for the beam failure.

In some embodiments, before the detection of the beam failure on the SCell 102, the terminal device 120 may have detected a beam failure and initiated a recovery procedure on a first/one SCell in a first group of SCells using CFRA. While the recovery procedure for the first SCell is still on-going (RACH procedure for beam failure recovery has been initiated), the beam failure recovery is triggered for the SCell 102 which belongs to a different group of SCells than the first group of SCells (i.e. the two groups are exclusive groups). In this case, the terminal device 120 may cancel the on-going recovery procedures (the random access procedure for beam failure recovery) on the first SCell and generate the SCell BFR MAC CE and initiate RACH/SR procedure on the PCell 101. In this way, the signaling of beam failures on the at least two cells can be more efficient. Alternatively, the terminal device 120 may continue the random access procedure for beam failure recovery on the first SCell and generate the SCell BFR MAC CE and initiate a RACH/SR procedure on the PCell 101.

At 340, the terminal device 120 transmits the MAC CE to a network device associated with the serving cell. For example, the terminal device 120 transmits the SCell BFR MAC CE to the network device 110. In general, the SCell BFR MAC CE is sent only on the cells that are not in the beam management groups where the beam failure was detected, unless the UL grant is given during the random access procedure.

In some embodiments, the terminal device 120 may apply implicitly mapping restrictions for the generated SCell BFR MAC CE for transmission. For example, the terminal device 120 may restrict the mapping of the SCell BFR MAC CE to granted uplink resources on the failed SCells or group of SCells. In other words, the MAC entity of the terminal device 120 does not multiplex the SCell BFR MAC CE for any uplink resource that has been allocated for SCells or group of SCells where beam failure has been detected. The terminal device 120 may instead map the generated SCell BFR MAC CE to a granted uplink resource on the PCell 101 or any SCell or group of SCells where no beam failure has been detected. Such uplink resource may be considered as a valid uplink resource for the SCell BFR MAC CE, for instance.

In some embodiments, the network device 110 may configure the terminal device 120 with a specific uplink signaling resource to indicate a beam failure on an SCell (e.g. SCell 102) or group of SCells. Such uplink signaling resource may be individually configured for each SCell/SCell group or may be applied commonly to all SCells/SCell groups which have been configured for the terminal device 120. Such signaling resource may be configured on the PCell 101 of the terminal device 120. Such signaling may be called an SCell beam failure indication, for instance. The specific uplink signaling resource may be any of the Scheduling Request (SR) resource, Physical Random Access Channel preamble (PRACH preamble), or a configured grant resource. The specific uplink signaling resource may be configured on, e.g., PUCCH (Physical Uplink Control Channel), PRACH, or PUSCH (Physical Uplink Shared Channel).

In some embodiments, if the terminal device 120 has no valid uplink resource (such as that defined above) for the SCell BFR MAC CE, the transmission of the SCell beam failure indication may be enforced. The network device 110 may determine, based on the received SCell beam failure indication from the terminal device 120, that beam failure has been detected on at least one SCell/SCell group. The network device 110 may therefore allocate a valid uplink resource, for instance an uplink grant, for the terminal device 120 to transmit the SCell BFR MAC CE. For instance, the valid uplink resource could be provided on the PCell 101 or on an SCell where beam failure has not been detected. In the case where the terminal device 120 is not configured with the specific uplink signaling resource to perform the SCell beam failure indication, it may trigger and perform random access procedure on the PCell 101.

In some embodiments, the terminal device 120 may transmit the SCell BFR MAC CE on a cell that does not belong to the beam management groups where the beam failure has been detected, for example, does not belong to the group of SCells including the SCell 102. In this case, at 340, the terminal device 120 may further determine a cell from the PCell 101, the SCell 102 and a further SCell serving the terminal device 120. The determined cell is different from the serving cell where the beam failure has been detected. As an example, if the beam failure has been detected on the SCell 102, the determined cell may be the PCell 101 or another SCell which belongs to a different group of SCells with the SCell 102. Then, the terminal device 120 may transmit the MAC CE on the determined cell.

In some embodiments, the terminal device 120 may transmit, during the random access procedure, the SCell BFR MAC CE. For ease of discussion, it is assumed that the beam failure on the SCell 102 occurs on a first beam of the SCell 102. In this case, at 340, the terminal device 120 may transmit a random access preamble to the network device 110. Upon receiving the random access preamble, the network device 110 may determine a second beam being different from the first beam and transmit an uplink grant for the second beam of the SCell 102. Upon receiving the uplink grant for the second beam of the SCell 102, the terminal device 120 may transmit the SCell BFR MAC CE via the second beam of the SCell 102.

As mentioned above, upon the detection of the beam failure on e.g. the SCell 102, the terminal device 120 may determine a new beam for the SCell 102. For example, the terminal device 120 may select a candidate beam from a list of candidate reference signals based on measurements on the candidate reference signals (for example, L1-RSRP measurements) and transmit information of the selected candidate beam to the network device 110 for further communication between the network device 110 and the terminal device 120. The information of the selected candidate beam may be included in the SCell BFR MAC CE. Alternatively or in addition, the information of the selected candidate beam may be transmitted using another MAC CE or an uplink control channel report (such as PUCCH or PUSCH beam reporting, candidate beam reporting).

In some embodiments, for each of the serving cells or groups of cells as indicated in failure condition, the SCell BFR MAC CE may further include information of a new candidate RS/beam (SSB or CSI-RS). The terminal device 120 may include the information of the selected candidate beam into the SCell BFR MAC CE and transmit, at 340, the SCell BFR MAC CE to the network device 110. The information of the selected candidate beam for each of the serving cells or groups of cells as indicated in failure condition may be included in the fields following the bitmap 402 or 502 shown in FIGS. 4 and 5.

Optionally, the information of the selected candidate beam may include an indication whether SSB or CSI-RS is reported. There may also be an indication that no new candidate beam exists for the indicated serving cells(s)/group(s) of cells.

In the case where the UL grant for transmitting the SCell BFR MAC CE cannot accommodate the reporting of candidate beams to all failed cells, the reported cells may be in one of increasing/decreasing order of the index(es) of SCell(s)/group(s) of SCells; order configured by the network device 110; based on the number of cells associated to a group of SCells; or any combination thereof.

In some other embodiments, the terminal device 120 may transmit the information of the selected candidate beam using another specific MAC CE or an uplink control channel report. The terminal device 120 may receive, from the network device 110, a request for a candidate beam report. Then the terminal device 120 may generate a further MAC CE or an uplink control channel report including the information of the selected candidate beam and transmit the further MAC CE or the uplink control channel report to the network device 110.

As an example, when the terminal device 120 has successfully transmitted the SCell BFR MAC CE, it may generate a MAC CE for reporting candidate beam(s) for each cell as indicated in failure condition. Optionally, this candidate beam report may be request by the network device 110 using specific MAC CE. After successful transmission of the SCell BFR MAC CE, the terminal device 120 may initiate a timer. If the network device 110 does not request the terminal device 120 to report any new candidate beam before the timer expires, the terminal device 120 may deactivate the failed cell (for example, the SCell 102).

As another example, the network device 110 may trigger aperiodic PUCCH or MAC CE reporting for the cell(s) for which the terminal device 120 reports a beam failure. If the network device 110 triggers aperiodic PUCCH report for the recently indicated failed SCell, the terminal device 120 reports up to N best candidate beams in the PUCCH report.

In this aperiodic PUCCH report, the terminal device 120 may report any DL RS that has not been configured for e.g. periodic beam reporting. Optionally, the reported candidate beams may be SSB beams, CSI-RS beams or CSI-RS and SSB beams.

If the network device 110 triggers candidate beam reporting via MAC CE, the terminal device 120 may generate SCell specific report, or include all the failed SCell with candidate beams in the report.

Alternatively, the candidate beam reporting may be SINR based i.e. hypothetical PDCCH BLER based reporting.

In some embodiments, the terminal device 120 may further monitor a response to the transmitted SCell BFR MAC CE from the network device 110. If no response is received in a predetermined period of time, the terminal device 120 may deactivate the SCell where beam failure has been detected, e.g. the SCell 102. For example, when the terminal device 120 has triggered the report and successfully transmitted the SCell BFR MAC CE, it may initiate the deactivation timer. If the network device 110 does not configure reporting or new TCI state for at least the indicated SCell 102, the terminal device 120 may deactivate it. Alternatively, the terminal device 120 may deactivate the SCells indicated as beam failure if it does not receive report request/new TCI state for PDCCH for those cells.

Figure 6:
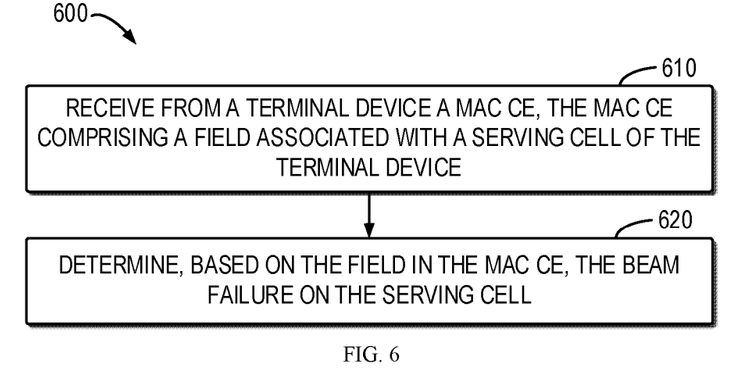
FIG. 6 shows a flowchart of an example method for BFR according to some embodiments of the present disclosure.

FIG. 6 shows a flowchart of an example method 600 for BFR according to some example embodiments of the present disclosure. The method 600 can be implemented at the network device 110 as shown in FIG. 1. For the purpose of discussion, the method 600 will be described with reference to FIG. 1.

At 610, the network device 110 receives, from a terminal device 120, a MAC CE, the MAC CE (e.g. the SCell BFR MAC CE 400 or 500) comprising a field associated with a serving cell of the terminal device 120, the serving cell comprising at least one of the PCell 101 and the SCell 102 serving the terminal device 120, wherein the field is set to be a predefined value indicating a beam failure.

In some embodiments, the serving cell comprises the SCell 102 and the field associated with the serving cell may be included in a bitmap, such as the bitmap 402 or 502. The bitmap includes a plurality of fields, each of which is associated with an SCell or a group of SCells.

In some embodiments, the bitmap may include a further field associated with a PCell, e.g. the PCell 101. The network device 110 may further determine, based on the further field in the bitmap, a beam failure on the PCell 101.

In some embodiments, the field associated with the serving cell comprises Logical Channel ID, LCID, set to be the predefined value.

In some embodiments, the network device 110 may receive the MAC CE on a cell being different from the serving cell, and the cell is determined by the terminal device 120 from the PCell 101, the SCell 102 and a further SCell serving the terminal device 120.

In some embodiments, the beam failure may occur on a first beam of serving cell (e.g. the SCell 102). The network device 110 may receive a random access preamble from the terminal device 120 and transmit an uplink grant for a second beam of the serving cell, the second beam being different from the first beam in response to the reception of the random access preamble. The network device 110 may then receive the MAC CE via the second beam of the serving cell.

At 620, the network device 110 determines, based on the field in the MAC CE, the beam failure on the serving cell (e.g. the SCell 102).

In some embodiments, the network device 110 may further receive information of a candidate beam from the terminal device 120. The candidate beam may be selected by the terminal device from a list of candidate reference signals based on measurements on the candidate reference signals. The network device 110 may then communicate with the terminal device 120 via the selected candidate beam.

In some embodiments, the information of the candidate beam may be included in the SCell BFR MAC CE. The network device 110 may receive the MAC CE from the terminal device 120 and determine, from the MAC CE, the information of the candidate beam.

In some embodiments, the network device 110 may transmit to the terminal device 120 a request for a candidate beam report, and may receive, from the terminal device 120, a further MAC CE or an uplink control channel report including the information of the candidate beam.

In some embodiments, the serving cell may comprise the secondary cell and if at 610 the MAC CE is received from the terminal device 120, the network device 110 may transmit to the terminal device 120 a response to the received MAC CE.

In some embodiments, an apparatus capable of performing the method 300 (for example, the terminal device 120) may comprise means for performing the respective steps of the method 300. The means may be implemented in any suitable form. For example, the means may be implemented in a circuitry or software module.

In some embodiments, the apparatus comprises: means for detecting a beam failure on a serving cell of the terminal device, the serving cell comprising at least one of a primary cell and a secondary cell serving the terminal device; means for in response to detecting the beam failure on the serving cell, generating a medium access control, MAC, control element, CE, the MAC CE comprising a field associated with the serving cell, wherein the field is set to be a predefined value indicating the beam failure; and means for transmitting the MAC CE to a network device associated with the serving cell.

In some embodiments, the serving cell comprises the secondary cell and the field associated with the serving cell is included in a bitmap, the bitmap including a plurality of fields, each of the plurality of fields associated with a secondary cell or a group of secondary cells.

In some embodiments, the bitmap includes a further field associated with the primary cell and the apparatus further comprises means for detecting a beam failure on the primary cell; and means for in response to detecting the beam failure on the primary cell, setting the further field associated with the primary cell to be the predefined value to indicate the beam failure on the primary cell.

In some embodiments, the means for in response to detecting the beam failure on the secondary cell generating the MAC CE may comprise means for in response to detecting the beam failure on the serving cell, determining a contention free random access, CFRA, resource configured for the beam failure on the serving cell; and means for generating the MAC CE in response to absence of the CFRA resource or the CFRA resource being unavailable.

In some embodiments, the serving cell comprises the secondary cell and the means for in response to detecting the beam failure on the secondary cell generating the MAC CE may comprise means for determining a further beam failure on a further secondary cell serving the terminal device; and means for in response to the further beam failure on the further secondary cell being determined, generating the MAC CE, the MAC CE comprising a further field associated with the further secondary cell, wherein the further field is set to be the predefined value.

In some embodiments, the further secondary cell and the secondary cell belong to different groups of secondary cells.

In some embodiments, means for transmitting the MAC CE may comprise means for determining a cell from the primary cell, the secondary cell and a further secondary cell serving the terminal device, the determined cell being different from the serving cell; and means for transmitting the MAC CE on the determined cell.

In some embodiments, the beam failure occurs on a first beam of the serving cell and means for transmitting the MAC CE may comprise means for transmitting a random access preamble to the network device; and means for in response to receiving an uplink grant for a second beam of the serving cell, transmitting the MAC CE via the second beam of the serving cell, the second beam being different from the first beam.

In some embodiments, the apparatus further comprises: means for in response to detecting the beam failure on the serving cell, selecting a candidate beam from a list of candidate reference signals based on measurements on the candidate reference signals; and means for transmitting information of the selected candidate beam to the network device for further communication between the network device and the terminal device.

In some embodiments, the means for transmitting information of the selected candidate beam may comprise means for including, into the MAC CE, the information of the selected candidate beam; and means for transmitting the MAC CE to the network device.

In some embodiments, the means for transmitting information of the selected candidate beam may comprise means for in response to receiving, from the network device, a request for a candidate beam report, generating a further MAC CE or an uplink control channel report including the information of the selected candidate beam; and means for transmitting the further MAC CE or the uplink control channel report to the network device.

In some embodiments, the serving cell comprises the secondary cell and the apparatus further comprises: means for monitoring a response to the transmitted MAC CE from the network device; and means for in response to absence of the response in a predetermined period of time, deactivating the secondary cell.

In some embodiments, the field associated with the serving cell comprises Logical Channel ID, LCID, set to be the predefined value.

In some embodiments, an apparatus capable of performing the method 600 (for example, the network device 110) may comprise means for performing the respective steps of the method 600. The means may be implemented in any suitable form. For example, the means may be implemented in a circuitry or software module.

In some embodiments, the apparatus comprises: means for receiving, from a terminal device, a medium access control, MAC, control element, CE, the MAC CE comprising a field associated with a serving cell of the terminal device, the serving cell comprising at least one of a primary cell and a secondary cell serving the terminal device, wherein the field is set to be a predefined value indicating a beam failure; and means for determining, based on the field in the MAC CE, the beam failure on the serving cell.

In some embodiments, the serving cell comprises the secondary cell and the field associated with the serving cell is included in a bitmap, the bitmap including a plurality of fields, each of the plurality of fields associated with a secondary cell or a group of secondary cells In some embodiments, the bitmap includes a further field associated with the primary cell and the apparatus may further comprise means for determining, based on the further field in the bitmap, a beam failure on the primary cell.

In some embodiments, the means for receiving the MAC CE may comprise means for receiving the MAC CE on a cell being different from the serving cell, the cell being determined by the terminal device from the primary cell, the secondary cell and a further secondary cell serving the terminal device.

In some embodiments, the beam failure occurs on a first beam of the serving cell, and the means for receiving the MAC CE may comprise means for receiving a random access preamble from the terminal device; means for transmitting an uplink grant for a second beam of the serving cell, the second beam being different from the first beam; and means for receiving the MAC CE via the second beam of the serving cell.

In some embodiments, the apparatus may further comprise means for receiving information of a candidate beam from the terminal device, the candidate beam being selected by the terminal device from a list of candidate reference signals based on measurements on the candidate reference signals; and means for communicating with the terminal device via the candidate beam.

In some embodiments, the means for receiving the information of the candidate beam may comprise means for receiving the MAC CE from the terminal device; and means for determining, from the MAC CE, the information of the candidate beam.

In some embodiments, the means for receiving the information of the candidate beam may comprise means for transmitting to the terminal device a request for a candidate beam report; and means for receiving, from the terminal device, a further MAC CE or an uplink control channel report including the information of the candidate beam.

In some embodiments, the serving cell comprises the secondary cell and the apparatus may further comprise means for in response to receiving the MAC CE from the terminal device, transmitting to the terminal device a response to the received MAC CE.

In some embodiments, the field associated with the serving cell comprises Logical Channel ID, LCID, set to be the predefined value.

Figure 7:
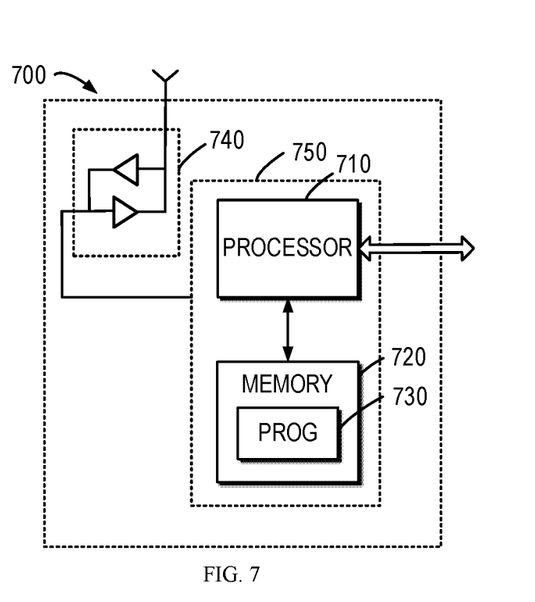
FIG. 7 is a simplified block diagram of a device that is suitable for implementing example embodiments of the present disclosure.

FIG. 7 is a simplified block diagram of a device 700 that is suitable for implementing example embodiments of the present disclosure. The device 700 can be considered as a further example implementation of a terminal device 120 as shown in FIG. 1. Accordingly, the device 700 can be implemented at or as at least a part of the terminal device 110.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the example embodiments of the present disclosure, as discussed herein with reference to FIGS. 3 and 6. The example embodiments herein may be implemented by computer software executable by the processor 710 of the device 700, or by hardware, or by a combination of software and hardware. The processor 710 may be configured to implement various example embodiments of the present disclosure. Furthermore, a combination of the processor 710 and memory 720 may form processing means 750 adapted to implement various example embodiments of the present disclosure.

The memory 720 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 and 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
   detecting a beam failure on a serving cell of a terminal device, the serving cell comprising at least one of a primary cell or a secondary cell serving the terminal device;
   in response to detecting the beam failure on the serving cell, generating a medium access control control element, the medium access control control element comprising a field associated with the serving cell, wherein the field is set to be a predefined value indicating the beam failure; and transmitting the medium access control control element to a network device associated with the serving cell, wherein the serving cell comprises the secondary cell and the field associated with the serving cell is included in a bitmap, the bitmap including a plurality of fields, each of the plurality of fields associated with a secondary cell or a group of secondary cells.

2. The method of claim 1, wherein the bitmap includes a further field associated with the primary cell, the method further comprising:

detecting a beam failure on the primary cell; and in response to detecting the beam failure on the primary cell, setting the further field associated with the primary cell to be the predefined value to indicate the beam failure on the primary cell.

3. The method of claim 1, wherein generating the medium access control control element comprises:

in response to detecting the beam failure on the serving cell, determining a contention free random access resource configured for the beam failure on the serving cell; and generating the medium access control control element in response to absence of the contention free random access resource or the contention free random access resource being unavailable.

4. The method of claim 1, wherein the serving cell comprises the secondary cell and generating the medium access control control element comprises:

determining a further beam failure on a further secondary cell serving the terminal device; and in response to the further beam failure on the further secondary cell being determined, generating the medium access control control element, the medium access control control element comprising a further field associated with the further secondary cell, wherein the further field is set to be the predefined value.

5. The method of claim 4, wherein the further secondary cell and the secondary cell belong to different groups of secondary cells.

6. The method of claim 1, wherein transmitting the medium access control control element to the network device comprises:

determining a cell from the primary cell, the secondary cell and a further secondary cell serving the terminal device, the determined cell being different from the serving cell; and transmitting the medium access control control element on the determined cell.

7. The method of claim 1, wherein the beam failure occurs on a first beam of the serving cell, and transmitting the medium access control control element to the network device comprises:

transmitting a random access preamble to the network device; and in response to receiving an uplink grant for a second beam of the serving cell, transmitting the medium access control control element via the second beam of the serving cell, the second beam being different from the first beam.

8. The method of claim 1, further comprising:

in response to detecting the beam failure on the serving cell, selecting a candidate beam from a list of candidate reference signals based on measurements on the candidate reference signals; and transmitting information of the selected candidate beam to the network device for further communication between the network device and the terminal device.

9. The method of claim 8, wherein transmitting the information of the selected candidate beam comprises:

including, into the medium access control control element, the information of the selected candidate beam; and transmitting the medium access control control element to the network device.

10. The method of claim 9, wherein transmitting the information of the selected candidate beam comprises:

in response to receiving, from the network device, a request for a candidate beam report, generating a further medium access control control element or an uplink control channel report including the information of the selected candidate beam; and transmitting the further Medium access control control element or the uplink control channel report to the network device.

11. The method of claim 1, wherein the serving cell comprises the secondary cell and the method further comprises:

monitoring a response to the transmitted Medium access control control element from the network device; and in response to absence of the response in a predetermined period of time, deactivating the secondary cell.

12. The method of claim 1, wherein the field associated with the serving cell comprises Logical Channel ID, logical channel ID set to be the predefined value.

13. A method, comprising:

receiving, from a terminal device, a medium access control control element, the medium access control control element comprising a field associated with a serving cell of the terminal device, the serving cell comprising at least one of a primary cell or a secondary cell serving the terminal device, wherein the field is set to be a predefined value indicating a beam failure; and determining, based on the field in the medium access control control element, the beam failure on the serving cells, wherein the serving cell comprises the secondary cell and the field associated with the serving cell is included in a bitmap, the bitmap including a plurality of fields, each of the plurality of fields associated with a secondary cell or a group of secondary cells.

14. The method of claim 13, wherein the bitmap includes a further field associated with the primary cell, the method further comprising: determining, based on the further field in the bitmap, a beam failure on the primary cell.

15. The method of claim 13, wherein receiving the medium access control control element comprises:

receiving the medium access control control element on a cell being different from the serving cell, the cell being determined with the terminal device from the primary cell, the secondary cell and a further secondary cell serving the terminal device.

16. The method of claim 13, wherein the beam failure occurs on a first beam of the serving cell, and receiving the medium access control control element comprises:

receiving a random access preamble from the terminal device;

transmitting an uplink grant for a second beam of the serving cell, the second beam being different from the first beam; and receiving the medium access control control element via the second beam of the serving cell.

17. The method of claim 13, further comprising:
receiving information of a candidate beam from the terminal device, the candidate beam being selected with the terminal device from a list of candidate reference signals based on measurements on the candidate reference signals; and
communicating with the terminal device via the candidate beam.

18. The method of claim 17, wherein receiving the information of the candidate beam comprises:
receiving the medium access control control element from the terminal device; and
determining, from the medium access control control element, the information of the candidate beam.

19. The method of claim 17, wherein receiving the information of the candidate beam comprises:
transmitting to the terminal device a request for a candidate beam report; and receiving, from the terminal device, a further medium access control control element or an uplink control channel report including the information of the candidate beam.

20. The method of claim 13, wherein the serving cell comprises the secondary cell and the method further comprises:
in response to receiving the medium access control control element from the terminal device, transmitting to the terminal device a response to the received medium access control control element.

21. The method of claim 13, wherein the field associated with the serving cell comprises Logical Channel ID, logical channel ID set to be the predefined value.

22. A terminal device comprising:
at least one processor; and
at least one non-transitory memory storing instructions, that when executed by the at least one processor, cause the terminal device at least to:
detect a beam failure on a serving cell of a terminal device, the serving cell comprising at least one of a primary cell or a secondary cell serving the terminal device; and
in response to detecting the beam failure on the serving cell, generate a medium access control control element, the medium access control control element comprising a field associated with the serving cell,
wherein the field is set to be a predefined value indicating the beam failure; and transmitting the medium access control control element to a network device associated with the serving cell, and
wherein the serving cell comprises the secondary cell and the field associated with the serving cell is included in a bitmap, the bitmap including a plurality of fields, each of the plurality of fields associated with a secondary cell or a group of secondary cells.

23. The terminal device of claim 22, wherein the bitmap includes a further field associated with the primary cell, the method further comprising:
detecting a beam failure on the primary cell; and
in response to detecting the beam failure on the primary cell, setting the further field associated with the primary cell to be the predefined value to indicate the beam failure on the primary cell.

24. The terminal device of claim 22, wherein generating the medium access control control element comprises the at least one non-transitory memory is storing instructions, that when executed by the at least one processor, cause the terminal device at least to:

in response to detecting the beam failure on the serving cell, determine a contention free random access resource configured for the beam failure on the serving cell; and
generating the medium access control control element in response to absence of the contention free random access resource or the contention free random access resource being unavailable.

25. The terminal device of claim 22, wherein the serving cell comprises the secondary cell and generating the medium access control control element comprises the at least one non-transitory memory is storing instructions, that when executed by the at least one processor, cause the terminal device at least to:
determine a further beam failure on a further secondary cell serving the terminal device; and
in response to the further beam failure on the further secondary cell being determined, generate the medium access control control element, the medium access control control element comprising a further field associated with the further secondary cell, wherein the further field is set to be the predefined value.

26. The terminal device of claim 25, wherein the further secondary cell and the secondary cell belong to different groups of secondary cells.

27. The terminal device of claim 22, wherein transmitting the medium access control control element to the network device comprises the at least one non-transitory memory is storing instructions, that when executed by the at least one processor, cause the terminal device at least to:
determine a cell from the primary cell, the secondary cell and a further secondary cell serving the terminal device, the determined cell being different from the serving cell; and
transmit the medium access control control element on the determined cell.

28. The terminal device of claim 22, wherein the beam failure occurs on a first beam of the serving cell, and transmitting the medium access control control element to the network device comprises the at least one non-transitory memory is storing instructions, that when executed by the at least one processor, cause the terminal device at least to:
transmit a random access preamble to the network device; and
in response to receiving an uplink grant for a second beam of the serving cell, transmit the medium access control control element via the second beam of the serving cell, the second beam being different from the first beam.

29. The terminal device of claim 22, wherein the at least one non-transitory memory is storing instructions, that when executed by the at least one processor, cause the terminal device at least to:
in response to detecting the beam failure on the serving cell, select a candidate beam from a list of candidate reference signals based on measurements on the candidate reference signals; and
transmit information of the selected candidate beam to the network device for further communication between the network device and the terminal device.

30. The terminal device of claim 29, wherein transmitting the information of the selected candidate beam comprises the at least one non-transitory memory is storing instructions, that when executed by the at least one processor, cause the terminal device at least to:
include, into the medium access control control element, the information of the selected candidate beam; and transmit the medium access control control element to the network device.

31. The terminal device of claim 30, wherein transmitting the information of the selected candidate beam comprises the at least one non-transitory memory is storing instructions, that when executed by the at least one processor, cause the terminal device at least to:
   in response to receiving, from the network device, a request for a candidate beam report, generate a further medium access control control element or an uplink control channel report including the information of the selected candidate beam; and
   transmit the further Medium access control control element or the uplink control channel report to the network device.

32. The terminal device of claim 22, wherein the serving cell comprises the secondary cell and the method further comprises the at least one non-transitory memory is storing instructions, that when executed by the at least one processor, cause the terminal device at least to:
   monitor a response to the transmitted Medium access control control element from the network device; and
   in response to absence of the response in a predetermined period of time, deactivate the secondary cell.

33. The terminal device of claim 22, wherein the field associated with the serving cell comprises Logical Channel ID, logical channel ID set to be the predefined value.

34. A network device comprising:
   at least one processor; and
   at least one non-transitory memory storing instructions, that when executed by the at least one processor, cause the terminal device at least to:
   receive, from a terminal device, a medium access control control element, the medium access control control element comprising a field associated with a serving cell of the terminal device, the serving cell comprising at least one of a primary cell or a secondary cell serving the terminal device, wherein the field is set to be a predefined value indicating a beam failure; and
   determine, based on the field in the medium access control control element, the beam failure on the serving cell,
   wherein the serving cell comprises the secondary cell and the field associated with the serving cell is included in a bitmap, the bitmap including a plurality of fields, each of the plurality of fields associated with a secondary cell or a group of secondary cells.

\* \* \* \* \*